United States Patent [19]
Yoshino et al.

[11] 3,716,496
[45] Feb. 13, 1973

[54] CATALYST COMPOSITION FOR THE OXIDATION AND THE OXIDATIVE DEHYDROGENATION OF OLEFINS

[75] Inventors: Takachika Yoshino, Yokohama; Shigeru Saito, Tokyo; Yutaka Sasaki, Yokohama, all of Japan

[73] Assignee: Nitto Chemical Industry Co., Ltd., Tokyo, Japan

[22] Filed: Sept. 2, 1970

[21] Appl. No.: 68,879

[30] Foreign Application Priority Data

Sept. 6, 1969   Japan...................................44/70297

[52] U.S. Cl. ................252/439, 252/454, 252/456, 260/465.3, 260/604 R, 260/680 E
[51] Int. Cl. ..............................................B01j 11/74
[58] Field of Search..............................252/439, 456; 260/680 E, 604 R, 465.3

[56] References Cited

UNITED STATES PATENTS

| | | |
|---|---|---|
| 3,338,952 | 8/1967 | Callahan et al.................. 260/465.3 |
| 3,409,697 | 11/1968 | Callahan et al. ..................260/680 E |
| 3,445,521 | 5/1969 | Callahan et al......................252/456 |
| 3,546,138 | 12/1970 | Callahan et al......................252/456 |
| 3,542,843 | 11/1970 | Yoshino et al....................260/604 R |
| 3,591,620 | 7/1971 | Yoshino et al. ...................260/465.3 |

FOREIGN PATENTS OR APPLICATIONS

| | | |
|---|---|---|
| 1,811,063 | 8/1969 | Germany...............................242/439 |

*Primary Examiner*—Daniel E. Wyman
*Assistant Examiner*—P. E. Konopka
*Attorney*—Henry T. Burke, Robert Scobey, Robert S. Dunham, P. E. Henninger, Lester W. Clark, Gerald W. Griffin, Thomas F. Moran, R. Bradlee Boal, Christopher C. Dunham and John F. Scully

[57] ABSTRACT

This invention provides a catalyst composition for an oxidation reaction selected from the group consisting of ammoxidation of olefins to nitriles, oxidation of olefins to aldehydes and oxidative dehydrogenation of olefins ($C_4 - C_8$) to diolefins.

The catalyst composition has the empirical formula:
$Fe_{10}$ $Sb_{20-60}$ $Me_{0.01-1}$ $Te_{0.05-5}$ $Q_{0.1-20}$ $O_{40-177}$ wherein Me is V, Mo and W ; Q is Cu, Ag, Be, Mg, Ca, Sr, Ba, Zn, Cd, La, Ce and Al.

The catalyst composition exhibits not only an improved catalytic activity in the reaction but also it shows desirable physical properties particularly fitted for a fluidized-bed reaction.

4 Claims, 3 Drawing Figures

INVENTORS
TAKACHIKA YOSHINO
SHIGERU SAITO
YUTAKA SASAKI

BY Henry T. Burke ATTORNEY

CATALYST COMPOSITION FOR THE OXIDATION AND THE OXIDATIVE DEHYDROGENATION OF OLEFINS

BACKGROUND OF THE INVENTION

1. Field of the Invention

This invention relates to catalyst compositions for the oxidation and the oxidative dehydrogenation of olefins, and more particularly it is concerned with multiple promoted iron oxide-antimony oxide catalysts having the improved physical properties, said catalysts including oxides of tellurium and oxides of at least one of metals selected from the group consisting of V, Mo and W as the promoter and also including oxides of at least one of elements selected from the group consisting of Cu, Ag, Be, Mg, Ca, Sr. Ba, Zn, Cd, La, Ce and Al as the modifier for improving physical properties of the catalysts.

The catalysts of this invention are particularly useful for the following oxidation reactions and oxidative dehydrogenation reactions, and they have not only much improved catalytic activity relating to the formation of the object products but also they have desirable physical properties particularly fitted for commercial use.

i. Ammoxidation of olefins, such as propylene and isobutylene, to the corresponding unsaturated nitriles, such as acrylonitrile and methacrylonitrile, respectively;

ii. Oxidation of olefins; such as propylene and isobutylene, to the corresponding unsaturated aldehydes, such as acrolein and methacrolein, respectively; and iii. Oxidative dehydrogenation of olefins having from 4 to 8 carbon atoms, such as 1-butene and 1-pentene, to the corresponding diolefins, such as butadiene and pentadiene, respectively.

2. Description of the Prior Art

U.S. Pat. No. 3,197,419 discloses that an iron oxide-antimony oxide catalyst (hereinafter referred to as "Fe-Sb system catalyst") is useful for the ammoxidation reaction mentioned above (i), for the oxidation reaction mentioned above (ii) and for the oxidative dehydrogenation reaction mentioned above (iii).

However, the Fe-Sb system catalyst has a drawback that it is essentially weak to a reductive atmosphere, and if the reaction mentioned above (i), (ii) or (iii) is carried out using the catalyst under a low oxygen content atmosphere, it results in lowering of selectivity of the object product and, in an extreme case, it results in a permanent degradation of catalysis.

Prior to the present invention, we found multiple promoted iron oxide-antimony oxide catalysts which overcome the above drawback and have a much improved catalytic activity relating to the formation of the object products, and we have filed a patent application relating to the reactions (i), (ii) and (iii) mentioned above using said catalysts.

The said catalyst has a composition having the following empirical formula:

$Fe_aSb_bMe_cTe_dO_e$ wherein Me represents an element selected from the group consisting of vanadium, molybdenum and tungsten; and $a$, $b$, $c$, $d$, and $e$ represent atomic ratios and $a = 10$
$b = 5 - 60$
$c = 0.01 - 1$
$d = 0.05 - 5$
$e$ = the number of oxygen atoms in the oxide produced by combining the above-mentioned components which corresponds to 22–149.

Any catalyst which falls under the range defined by the above empirical formula has a good activity relating to the formation of the object products, and this tendency is remarkable especially when the catalyst has a Sb/Fe ratio more than 2/1. However, a catalyst having such a high content of antimony often produces a quantity of "Sticks" on its surface during a high temperature calcination step which is carried out (usually at a temperature of 700°–1,100°C., preferably 700°–900°C) for giving a desired activity to the catalyst. "Sticks" mean micro-spiny materials which are produced prominently on the catalyst surface. Catalyst particles, on which are present a quantity of "Sticks," have an appearance like a cake sprinkled with sugar, as shown in the attached FIG. 3. When a catalyst having "Sticks" is used under an operation condition conventionally employed for the (i), (ii) or (iii) reaction aforementioned, the "Sticks" easily peel off from the catalyst surface and they are scattered as minute sticky fragments to block up pipes at the exit portion of the reactor. Such a trouble may be encountered somewhat in a case using fixed bed catalyst, but remarkably in a case using fluidized bed catalyst.

SUMMARY OF THE INVENTION

According to our research, it has been found that "Sticks" consist of antimony oxides which comprise mainly antimony tetroxide, and also that from the viewpoint of "anti-sticks" only "all of metal elements capable of reacting antimony oxides when said elements are mixed with said antimony oxides and the resulting mixture is calcined at a temperature of 300°–1,000°C" are useful for this purpose. These metal elements include alkali metals (Li, Na, K, Rb, Cs); IB group metals (especially Cu, Ag); IIA group metals (Be, Mg, Ca, Sr, Ba); IIB group metals (especially Zn, Cd); IIIA group metals (especially La, Ce); IVB group metals (especially Al) of periodic Table; and polyvalent metals selected from the group consisting of Fe, Co, Ni, Sn, U, Cr, Mn, Ti, V, Mo, W, Te, Bi, As, Th and Pb. The above-mentioned elements as modifiers which prevent "Stick" formation and are effective for improving the physical properties of catalyst are hereinafter referred to as "anti-sticks" agent.

From the viewpoint of "anti-sticks" effect only, there are not any specific limitations with respect to the sort of the above-mentioned metal elements and the formulation ratio thereof. In order to greatly decrease or substantially extinguish "Sticks" without impairing the activity of the above multiple promoted catalyst, however, there must be added considerable limitations with respect to the sort of the metal elements and the formulation ratio thereof.

The present invention has been completed, based on the discovery of the above-mentioned new facts, by carrying out studies on the selection of the sort of the metal elements as the "anti-sticks" agent and on the determination of the amount thereof to be added, so that said metal elements achieve the expected "anti-sticks" effect without affecting adversely on the activity of the above multiple promoted catalyst.

The present invention provides a catalyst composition for an oxidation reaction selected from the group consisting of ammoxidation of olefins to the corresponding unsaturated nitriles, oxidation of olefins to the corresponding unsaturated aldehydes, and oxidative dehydrogenation of olefins having four to eight carbon atoms, to the corresponding diolefins, said catalyst composition being free from "Sticks" and having the empirical formula:

$Fe_a Sb_b Me_c Te_d Q_e O_f$ wherein $M_e$ represents an element selected from the group consisting of V, Mo and W ; Q represents an element selected from the group consisting of Cu, Ag. Be, Mg, Ca, Sr. Ba, Zn, Cd, La, Ce and Al; and $a, b, c, d, e$ and $f$ represent atomic ratios and $a = 10$
$b = 20 - 60$
$c = 0.01 - 1$
$d = 0.05 - 5$
$e = 0.1 - 20$
$f =$ the number of oxygen atoms in the oxide produced by combining the above-mentioned components which corresponds to 40–177.

FIG. 1 and FIG. 2 show microscopic photographs of catalyst particles which consist of the catalyst composition according to the present invention and which have no "Sticks" (FIG. 1) and very few "Sticks" (FIG. 2), respectively.

FIG. 3 shows a microscopic photograph of catalyst particles which have a composition similar to the catalyst composition of the present invention but does not include any "anti-sticks" agent disclosed by the present invention and accordingly have a quantity of "Sticks" on their surface. From the comparison of FIGS. 1 and 2 with FIG. 3 (and from the disclosure of examples hereinafter mentioned), the "anti-sticks" effect of the present invention will be clearly understood.

In the catalyst composition of the present invention, the antimony component is added at an atomic ratio of from 20 to 60 per 10 of the iron component. In a catalyst composition including less antimony, the possibility of "Stick" formation is very little even if "Q" component ("anti-stick" component) is absent, and accordingly in this case there is no need for carrying out the "anti-sticks" treatment in accordance with the present invention. On the other hand, in a catalyst composition including more antimony, satisfactory "anti-sticks" effect cannot be expected unless excessive amount of "Q" component (which might affect adversely on the catalytic activity) is added.

The above-mentioned "Q" component is preferably added at an atomic ratio of 0.1 to 20 per 10 of the iron component. If a less amount of "Q" component is added, satisfactory "anti-sticks" effect cannot be expected. On the other hand, if a larger amount of "Q" component is added, although the "anti-sticks" effect can be expected perfectly, the preferable activity of the base multiple promoted catalyst ($Fe_a Sb_b Me_c Te_d O_f$) might be affected adversely thereby.

It is preferable to add the vanadium, molybdenum or tungsten component at an atomic ratio of from 0.01 to 1 per 10 of the iron component. If more vanadium, molybdenum or tungsten component is added, although the action of suppressing "degradation in low oxygen content" i.e., "the tendency of the decrease of oxygen in the gas formed" remains unchanged, the absolute value of selectivity undesirably falls. On the other hand, if less vanadium, molybdenum or tungsten component is added, its action of suppressing "degradation in low oxygen content" undesirably decreases.

The tellurium component is preferably added at an atomic ratio of from 0.05 to 5 per 10 of the iron component. If more tellurium component is added, the activity of the catalyst obtained is undesirably weakened, and when the catalyst is used in an atmosphere with a low oxygen content, "free-out" of metallic tellurium from the resulting catalyst is undesirably observed. On the other hand, if less tellurium component is added, the absolute value of selectivity undesirably decreases.

The catalysts having the above-mentioned composition can be produced by any known method, although it is particularly necessary that the components are intimately mixed and combined. The strict chemical structure of a material constituting the catalyst is unknown but said empirical formula is obtained as analytical value.

The starting material for providing the iron component of the catalyst can be selected from many members. For example, iron oxide in the form of ferrous oxide, ferric oxide or ferro-ferric oxides can be used. Also, such compounds as are finally stabilized as iron oxide after chemical treatment, calcining treatment or the like may be used. Those compounds include iron salts of inorganic acid such as iron notrate and iron chloride, iron salts of organic acid such as iron acetate and iron oxalate, etc. The salts can be converted into oxide by neutralizing them with a basic substance such as aqueous ammonia to form iron hydroxide and then calcining said iron hydroxide or by directly calcining these salts. Further, iron hydroxide or metallic iron can be used. The matallic iron may be added in the form of fine powder or may be treated with heated nitric acid. In the latter case iron is converted into ferric nitrate. Whatever starting material is selected, it is important to intimately mix the material with other components. Therefore, it is preferably added in the form of fine powder, aqueous solution or sol.

The starting material for the antimony component may be antimony oxide such as, for example, antimony trioxide, antimony tetroxide or antimony pentoxide. Also, such compounds as are finally stabilized as antimony oxide after chemical treatment, calcining treatment or the like may be used. For example, those compounds include hydrous antimony oxide, metaantimonic acid, orthoantimonic acid, pyroantimonic acid or the like. Also, hydrolyzable antimony salts such as antimony halides, for example, antimony trichloride and antimony pentachloride may be used. These antimony halides are hydrolyzed with water into hydrous oxides. The antimony halides may be used as they are since they are volatile at high temperatures.

Any one of water soluble or insoluble vanadium compounds can be used as the vanadium component source. For example, vanadium pentoxide, ammonium metavanadate, vanadyl oxalate, vanadium halides or the like may be used. Further, metallic vanadium can be used. It may be directly used in the form of metallic powder or may be reacted with heated nitric acid to form oxide.

Water soluble or insoluble molybdenum compounds may be used as the molybdenum component source. For example, molybdenum trioxide, molybdic acid, ammonium paramolybdate, ammonium metamolybdate, molybdenum halides or the like may be used. Further, metallic molybdenum can be used. It may be directly used in the form of metallic powder or may be reacted with heated nitric acid to form oxide.

With respect to the tungsten component source, there is applicable the same as described concerning the molybdenum component source.

Water soluble or insoluble tellurium compounds may be used as the tellurium component source. For instance, tellurium dioxide, tellurous acid or telluric acid may be used. Further, metallic tellurium may be used. It may be directly used in the form of a metallic powder or may be reacted with heated nitric acid to form an oxide.

The starting material for providing the "anti-stick" component in the present catalyst, i.e., each component of IB, IIB, IIIB, IIA and IIIA above-mentioned, may be selected from many kinds of them. The common preferable starting material may be nitrate, hydroxide and oxide of the component.

For instance, as the starting materials of copper, cupric nitrate or metallic copper dissolved in nitric acid may be preferably used. Also, copper hydroxide obtained by hydrolysis of cupric chloride, or cupric oxide may be used.

As the starting material of zinc and cadmium, zinc nitrate and cadmium nitrate may be preferably used respectively. They may be used in the form of a commercial reagent or in the form of metal dissolved in nitric acid. Also, zinc chloride, cadmium chloride and hydrolysis products thereof may be used.

As the starting material of aluninum, aluminum nitrate, or aluminum hydroxide obtained by acid-hydrolysis of sodium aluminate or by base-hydrolysis of aluminum chloride, may be preferably used.

As the starting material of beryllium, magnesium, calcium, strontium, barium, the corresponding nitrate may be preferably used. Magnesium, calcium, etc. may also be used in the form of magnesium hydroxide, magnesium oxide, calcium hydroxide, etc. dissolved in nitric acid.

As the starting material of lanthanum and cerium, the corresponding nitrate may be preferably used, but the corresponding oxide may also be used.

The activity of this catalyst system may be increased by heating at a high temperature. The catalyst material composition which has been prepared to provide the desired composition and has been intimately mixed is preferably dried, heated at a temperature of 200° to 600°C. for 2 to 24 hours and, if necessary, then heated at a temperature within a range of 700° to 1,100°C. for 1 to 48 hours. The materials should be blended so that the catalyst may have a fixed composition when the catalyst is used in the reaction after the calcining treatment.

The catalyst can show excellent activity even without any carrier, but it may be combined with any suitable carrier. The entire catalyst may contain 10 to 90 percent by weight of the catalyst composition afore-mentioned and 90 to 10 percent by weight of a carrier component. As a carrier silica, alumina, zirconia, silica alumina, silicon carbide, alundum, inorganic silicate, etc. may be used.

Any other additives such as a binding agent, which serve for improving the physical properties of the catalyst, may be optionally added unless they impair the activity of the catalyst.

These additives such as a carrier, a binding agent, an extender, etc. can be optionally added irrespective of their components unless they remarkably change the characteristics of the catalyst of the present invention disclosed by the above explanation or the examples mentioned below. The catalyst containing these additives should be also regarded as the catalyst of the present invention.

The catalyst may be used in a fixed-bed reaction in the form of pellet or may be used in a fluidized-bed reaction in the form of fine grain. However, as the trouble caused by "Sticks" formation is remarkable especially in a fluidized-bed reaction, the present invention, wherein the main advantage is to prevent "Sticks" formation, is more effectively embodied in a fluidized-bed catalyst.

The reaction conditions for the use of the catalyst of the present invention will be explained below.

AMMOXIDATION OF OLEFINS TO NITRILES

The reactants used in the ammoxidation of olefins to nitriles are oxygen, ammonia and an olefin.

The olefins should have only three carbon atoms in a straight chain, and they are preferably selected from the group consisting of propylene and isobutylene. The olefins may be in admixture with paraffinic hydrocarbons such as ethane, propane, butane and pentane.

Any oxygen source may be used, but air is usually used for economical reasons. Air may be suitably enriched with oxygen. The molar ratio of oxygen to olefin may be about 0.5:1 or higher, and more desirably is 1:1 or higher. Suitable molar ratio is in the range of from about 2:1 to about 6:1, particularly preferably in the range of from about 2:1 to 4:1.

The molar ratio of ammonia to olefin is suitably within the range of from about 0.7:1 to about 3:1, but it is substantially unnecessary that the molar ratio is 1.5:1 or higher because the catalyst of the present invention does not decompose ammonia. The fact that ammonia is not decomposed is advantageous in that the use of excess ammonia is unnecessary and no oxygen loss is caused by the consumption of oxygen for the decomposition of ammonia and thereby the molar ratio of oxygen to olefin can be maintained at a sufficiently high value during the reaction. This contributes to the improvement of conversion of olefins to the corresponding unsaturated nitriles.

A hitherto known bismuth phosphomolybdate catalyst has a defect that its ammonia decomposition ability is high. According to our experiment concerning this catalyst, it is required to suppress the decomposition of ammonia that not less than 3 mols of water per mol of olefin is added. On the other hand, the catalyst of this invention requires substantially no addition of water for the same purpose. The addition of water is disadvantageous from thermal and operational viewpoints.

However, the addition of water is somewhat effective for suppressing the formation of carbon dioxide, and accordingly water may be added in the present invention, if necessary. In that case, not more than five mols of water added per mol of olefin is sufficient.

As is clear from the fact that air which is a mixture of oxygen and nitrogen can be used as the oxygen source instead of pure oxygen, any suitable diluent may be used.

It is preferable but not always indispensable to feed an olefin, oxygen, ammonia and any optional diluent into a reactor in the form of a gaseous mixture thereof. If desired, liquefiable components may be charged in the form of a liquid. Also, these materials may be charged separately into the reactor through a few inlets. These materials, however, should be in the form of a gaseous mixture when they are contacted with the catalyst. The reaction temperature is suitably about 400° to about 550°C. and reaction temperature of about 420° to 510°C. gives particularly good results. It is preferable from operational point of view to carry out the reaction at about atmospheric pressure, but, if necessary, the reaction may be carried out at reduced pressure or under pressure.

Space velocity is also one of the reaction conditions in a vapor phase catalytic reaction using a solid catalyst. In the process of the present invention, space velocity of about 2,000 to about 100 hr.$^{-1}$ is suitable and space velocity of about 500 to about 200 hr.$^{-1}$ gives particularly good results. By space velocity is meant the volume (calculated in NTP) of gas passing per unit volume of catalyst per hour.

Desired unsaturated nitrile can be recovered from the reaction product by washing the gas leaving the reactor through its exit with cold water or a solvent which is suitable for the extraction of the nitrile. Any other recovery process which is customarily used in this kind of reaction may be used.

In the practice of the present invention, any one of the fixed-bed type, moving-bed type and fluidized-bed type apparatus, which are customarily used in vapor phase catalytic reactions, can be used.

OXIDATION OF OLEFINS TO ALDEHYDES

The reactants used in the oxidation of olefins to aldehydes are oxygen and an olefin.

The olefins and the oxygen sources are the same as described above.

The molar ratio of oxygen to propylene may be about 0.5:1 or higher, and more desirably is 1:1 or higher. Preferable molar ratio is in the range of from about 2:1 to about 6:1.

The addition of water is somewhat effective for suppressing the formation of carbon dioxide, and water may be added in the present invention, if necessary. In that case, not more than 5 mols of water added per mol of propylene is sufficient.

The reaction temperature is suitably about 370° to about 500°C. and reaction temperature of about 410° to 480°C. gives particularly good results. It is preferable from operational point of view to carry out the reaction at about atmospheric pressure, but, if necessary, the reaction may be carried out at reduced pressure or under pressure.

Space velocity is also one of the reaction conditions in a vapor phase catalytic reaction using a solid catalyst. In the process of the present invention, space velocity of about 2,000 to about 100 hr.$^{-1}$ is suitable and space velocity of about 1,000 to about 400 hr.$^{-1}$ gives particularly good results. The definition of space velocity is the same as mentioned above.

Desired unsaturated aldehyde can be recovered from the reaction product by washing the gas leaving the reactor through its exit with cold water or a solvent which is suitable for the extraction of the aldehyde. Any other recovery process which is customarily used in this kind of reaction may be used.

With respect to the feeding procedures of reactants into a reactor, and the types of the reactor, there is applicable the same as mentioned concerning the ammoxidation except for ammonia.

OXIDATIVE DEHYDROGENATION OF OLEFINS TO DIOLEFINS

The reactants used in the oxidative dehydrogenation of olefins to diolefins are oxygen and an olefin.

By the term "olefin" used concerning oxidative dehydrogenation is meant an open chain olefin having four to eight nonquaternary carbon atoms, of which at least four are arranged in series in a straight chain. The olefins include 1-butene, cis-2-butene, trans-2-butene, 2-methyle-1-propene, 1-pentene, cis-2-pentene, trans-2-pentene, 2-methyl-1-butene, 3-methyl-1-butene, 3-methyl-2-butene, 2-hexene, 2-methyl-1-pentene, 3-methyl-1-pentene, 4-methyl-1-pentene, 2-methyl-2-pentene, 3-ethyl-1-pentene, 2-ethyl-1-hexene and the like.

According to the catalyst of this invention, the olefins can be converted to the corresponding diolefins with an improved yield. For instance, there are obtained butadiene from butenes (1-butene, cis-2-butene, trans-2-butene or mixture thereof), pentadiene from 1-pentene or 2-pentene, isoprene from 2-methyl-1-butene, and hexadiene from 1-hexene.

Recently, the oxidative dehydrogenation of butenes to butadiene is noted because of its commercial importance. According to this invention, as the butene sources, there may be used not only 1-butene, cis-2-butene, trans-2-butene and the mixture thereof, but also spent B—B fraction which is obtained from B—B fraction by removing butadiene and isobutylene therefrom, said B—B fraction being obtained in petroleum refinery or by thermal cracking of petroleum fractions such as naphtha. In case of using said spent B—B fraction, paraffins contained therein are substantially inert in a reaction zone according to this invention. With respect to isobutylene which still remains in said material as impurity not completely removed therefrom, it is converted mainly to methacrolein in a reaction zone according to this invention. It is, however, easy to separate the methacrolein from the object product (butadiene) by utilizing the boiling temperature difference between them and/or the solubility difference in a solvent between them.

Any oxygen source may be used, but air is usually used for economical reasons. Air may be suitably enriched with oxygen. The molar ratio of oxygen to propylene is desirably 0.5:1 or higher. Preferable molar ratio is in the range of from about 1:1 to about 4:1.

The addition of water is somewhat effective for suppressing the formation of carbon dioxide, and water may be added in the present invention, if necessary. In that case, not more than 5 mols of water added per mol of propylene is sufficient.

The reaction temperature is suitably about 350° to about 500°C. and reaction temperature of about 400° to 480°C. gives particularly good results. It is preferable from operational point of view to carry out the reaction at about atmospheric pressure, but, if necessary, the reaction may be carried out at reduced pressure or under pressure.

Space velocity is also one of the reaction conditions in a vapor phase catalytic reaction using a solid catalyst. In the process of the present invention, space velocity of about 2,000 to about 100 hr.$^{-1}$ is suitable and space velocity of about 500 to about 150 hr.$^{-1}$ gives particularly good results. The definition of space velocity is the same as mentioned above.

Desired diolefin can be recovered from the reaction product by washing the gas leaving the reactor through its exit with a solvent such as acetonitrile which is suitable for the extraction of the diolefin. Any other recovery process which is customarily used in this kind of reaction may be used.

With respect to the feed procedures of reactants into a reactor, and the types of the reactor, there may be applicable the same as mentioned concerning the ammoxidation except for ammonia.

The constitution and effect of the present invention are illustrated by the following examples and comparative examples.

DESCRIPTION OF PREFERRED EMBODIMENTS

Catalysts Preparations

Example 1

Figure 1:
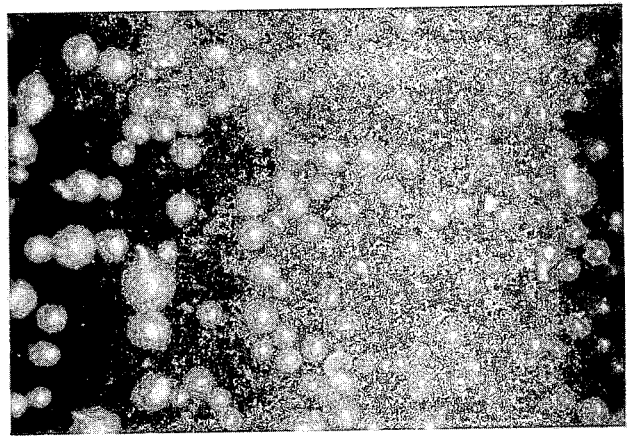

A catalyst having the empirical formula:

$$Mg_5 V_{0.1} Te_2 Fe_{10} Sb_{50} O_{124} (SiO_2)_{60}$$

was prepared as follows:

2.43 Kilograms of metallic antimony powder (100 mesh or finer) was added in portions to 8.86 liters of heated nitric acid (specific gravity : 1.38). After the whole amount of the antimony had been added and the generation of a brown gas had ceased, the mixture was allowed to stand at room temperature for 16 hours. Excess nitric acid was then removed and the precipitate formed was washed with water. The precipitate was then crushed in a ball mill. (I)

0.223 Kilograms of electrolytic iron powder was added in portions to a mixture consisting of 1.6 liters of nitric acid (specific gravity : 1.38) and 20 liters of water. The resulting mixture is heated to be completely dissolved. (II)

4.7 grams of ammonium metavanadate (NH$_4$VO$_3$) was dissolved in 0.5 liters of water while heating. (III)

184 grams of telluric acid was dissolved in 1.5 liters of water. (IV)

As a carrier component 7.21 Kilograms of silica sol (Snowtex-O manufactured by Nissan Chem. Co.; SiO$_2$ : 20 percent by weight) was used. (V)

513 grams of magnesium nitrate [Mg(No$_3$)$_2$ 6H$_2$O] were dissolved in silica sol above mentioned. (VI)

(I)-(VI) were mixed, and an aqueous ammonia solution (15 percent) was added thereto in portions with stirring to adjust the PH of the mixture to 2. The resulting mixture was heated with stirring at 100°C. for 5 hours.

The slurry thus obtained was adjusted to a suitable concentration and spray-dried by a conventional spray-dryer equipment.

Micro-spherical particles thus obtained were gradually heated to an elevated temperature in a rotary calciner having an external heating system, and the final temperature was 550°C. The particles were then calcined at 820°C. for 2 hours in an electric furnace having an external heating system.

Example 2

A catalyst having the empirical formula:

$$Cu_{12} V_{0.1} Te_2 Fe_{10} Sb_{50} O_{131} (SiO_2)_{60}$$

was prepared in the same manner as in Example 1 except that 1.16 Kilograms of cupric nitrate [Cu(NO$_3$)$_2$ ·3H$_2$O] were used instead of 513 grams of magnesium nitrate. The calcination temperature is also the same as in Example 1.

Example 3

A catalyst having the empirical formula:

$$Ag_{0.7} V_{0.1} Te_2 Fe_{10} Sb_{50} O_{120} (SiO_2)_{60}$$

was prepared in the same manner as in Example 1 except that 48 grams of silver nitrate was used instead of 513 grams of magnesium nitrate.

Example 4

A catalyst having the empirical formula:

$$Zn_3 V_{0.1} Te_2 Fe_{10} Sb_{50} O_{122} (SiO_2)_{60}$$

was prepared in the same manner as in Example 1 except that 357 grams of zinc nitrate [Zn(NO$_3$)$_2$·6H$_2$O] was used instead of 513 grams of magnesium nitrate.

Example 5

A catalyst having the empirical formula:

$$Ce_2 V_{0.1} Te_2 Fe_{10} Sb_{50} O_{122} (SiO_2)_{60}$$

was prepared in the same manner as in Example 1 except that 347 grams of cerium nitrate [Ce(NO$_3$)$_3$·6H$_2$O] was used instead of 513 grams of magnesium nitrate.

Example 6

A catalyst having the empirical formula:

$$Al_3 V_{0.1} Te_2 Fe_{10} Sb_{50} O_{124} (SiO_2)_{60}$$

was prepared in the same manner as in Example 1 except that 450 grams of aluminum nitrate [Al(NO$_3$)$_3$ ·9H$_2$O] was used instead of 513 grams of magnesium nitrate.

Example 7

A catalyst having the empirical formula:

$$La_2 W_{0.5} Te_1 Fe_{10} Sb_{25} O_{72} (SiO_2)_{30}$$

was prepared as follows:

There was taken 291 grams of antimony trioxide powder (20 μ or finer). (I)

There was taken 44.7 grams of electrolytic iron powder. 380 ml. of nitric acid (specific gravity : 1.38) was mixed with 400 ml. of water and the mixture was heated. The iron powder mentioned above was added in portions into the mixture to completely dissolve. Then 10.2 grams of tellurium powder was added thereto in portions to completely dissolve. (II)

10.4 grams of ammonium tungstate was dissolved in 500 ml. of water with heating. (III)

69.3 grams of lanthanum nitrate [La(NO$_3$)$_3$·6H$_2$O] was dissolved in 500 ml. of water. (IV)

As a carrier component 721 grams of silica sol (Snowtex-O manufactured by Nissan Chem. Co. ; SiO$_2$ : 20 percent by weight) was used. (V)

(I)-(V) were mixed, and an aqueous ammonia solution was added thereto in portions with stirring to adjust the PH of the mixture to 2. The resulting mixture was heated with stirring at 100°C for 3 hours.

The slurry thus obtained was adjusted to a suitable concentration and spray-dried by a conventional spray-dryer equipment.

Micro-spherical particles thus obtained were heated at 250°C. for 2 hours and then at 450°C. for 2 hours, and finally were calcined at 810°C. for 5 hours.

Example 8

A catalyst having the empirical formula:

$Ce_2 W_{0.5} Te_1 Fe_{10} Sb_{25} O_{72} (SiO_2)_{30}$ was prepared in the same manner as in Example 7 except that 62.1 grams of cerium nitrate was used instead of 69.3 grams of lanthanum nitrate.

Example 9

A catalyst having the empirical formula:

$Mg_8 W_{0.5} Te_1 Fe_{10} Sb_{25} O_{77} \cdot (SiO_2)_{30}$ was prepared in the same manner as in Example 7 except that 164 grams of magnesium nitrate was used instead of 69.3 grams of lanthanum nitrate.

Example 10

A catalyst having the empirical formula:

$Cd_3 W_{0.5} Te_1 Fe_{10} Sb_{25} O_{72} (SiO_2)_{30}$ was prepared in the same manner as in Example 7 except that 74 grams of cadmium nitrate $[Cd(NO_3)_2 \cdot 4H_2O]$ was used instead of 69.3 grams of lanthanum nitrate.

Example 11

A catalyst having the empirical formula:

$Al_3 W_{0.5} Te_1 Fe_{10} Sb_{25} O_{73} (SiO_2)_{30}$ was prepared in the same manner as in Example 7 except that 90 grams of aluminum nitrate $[Al(NO_3)_3 \cdot 9H_2O]$ was used instead of 69.3 grams of lanthanum nitrate.

Example 12–a

A catalyst having the empirical formula:

$Cu_{0.5} W_{0.5} Te_1 Fe_{10} Sb_{25} O_{69} (SiO_2)_{30}$ was prepared in the same manner as in Example 7 except that 9.7 grams of cupric nitrate $[Cu(NO_3)_2 \cdot 3H_2O]$ was used instead of 69.3 grams of lanthanum nitrate.

Example 12–b

A catalyst having the empirical formula:

$Cu_3 W_{0.5} Te_1 Fe_{10} Sb_{25} O_{72} \cdot (SiO_2)_{30}$ was prepared in the same manner as in Example 12–a except that 58 grams of cupric nitrate was used.

Example 12–c

A catalyst having the empirical formula:

$Cu_9 W_{0.5} Te_1 Fe_{10} Sb_{25} O_{78} \cdot (SiO_2)_{30}$ was prepared in the same manner as in Example 12–a except that 174 grams of cupric nitrate was used.

Example 13

A catalyst having the empirical formula:

$Cu_{0.5} Mo_{0.25} Te_1 Fe_{10} Sb_{25} O_{68} \cdot (SiO_2)_{60}$ was prepared as follows:

There was taken 2.91 kilograms of antimony trioxide powder (20 µ or finer). (I)

There was taken 0.447 kilograms of electrolytic iron powder. 3.2 liters of nitric acid (specific gravity: 1.38) was mixed with 2 liters of water and the mixture was heated. The iron powder mentioned above was added in portions into the mixture to completely dissolve. (II)

35.3 grams of ammonium molybdate $[3(NH_4)_2O-7 MoO_3 \cdot 4H_2O]$ was dissolved in 500 ml. of water and then 184 grams of telluric acid was added thereto to dissolve. (III)

As a carrier component 9.61 kilograms of silica sol (Ludox HX manufactured by DuPont; SiO₂: 30 percent by weight) was used. (IV)

97 grams of cupric nitrate $[Cu(NO_3)_2 \cdot 3H_2O]$ was dissolved in 500 ml. of water. (V)

(I)-(V) were mixed, and an aqueous ammonia solution was added thereto in portions with stirring to adjust the PH of the mixture to 2.0. The resulting mixture was heated with stirring at 100°C. for 4 hours.

The slurry thus obtained was adjusted to a suitable concentration and spray-dried conventionally.

Micro-spherical particules thus obtained were heated at 250°C. for 2 hours and then at 400°C. for 2 hours, and finally were calcined at 810°C. for 4 hours.

Example 14

A catalyst having the empirical formula:

$La_2 Mo_{0.25} Te_1 Fe_{10} Sb_{25} O_{71} \cdot (SiO_2)_{60}$ was prepared in the same manner as in Example 13 except that 693 grams of lanthanum nitrate $[La(NO_3)_3 \cdot 6H_2O]$ was used instead of 97 grams of cupric nitrate.

Example 15

A catalyst having the empirical formula:

$Al_3 Mo_{0.25} Te_1 Fe_{10} Sb_{25} O_{72} \cdot (SiO_2)_{60}$ was prepared in the same manner as in Example 13 except that 600 grams of aluminum nitrate was used instead of 97 grams of cupric nitrate.

Example 16

A catalyst having the empirical formula:

$Be_3 Mo_{0.25} Te_1 Fe_{10} Sb_{25} O_{71} \cdot (SiO_2)_{60}$ was prepared in the same manner as in Example 13 except that 449 grams of beryllium nitrate was used instead of 97 grams of cupric nitrate.

Example 17

A catalyst having the empirical formula:

$Mg_5 Mo_{0.25} Te_1 Fe_{10} Sb_{25} O_{73} \cdot (SiO_2)_{60}$ was prepared in the same manner as in Example 13 except that 1.03 kilograms of magnesium nitrate $[Mg(NO_3)_2 \cdot 6H_2O]$ was used instead of 97 grams of cupric nitrate.

Example 18

A catalyst having the empirical formula:

$Ca_5 Mo_{0.25} Te_1 Fe_{10} Sb_{25} O_{73} \cdot (SiO_2)_{60}$ was prepared in the same manner as in Example 13 except that 945 grams of calcium nitrate $[Ca(NO_3)_2 \cdot 4H_2O]$ am was used instead of 97 grams of cupric nitrate.

Example 19

A catalyst having the empirical formula:

$Sr_3 Mo_{0.25} Te_1 Fe_{10} Sb_{25} O_{71} \cdot (SiO_2)_{60}$ was prepared in the same manner as in Example 13 except that 508 grams of strontium nitrate was used instead of 97 grams of cupric nitrate.

Example 20

A catalyst having the empirical formula:

$Ba_3 Mo_{0.25} Te_1 Fe_{10} Sb_{25} O_{71} \cdot (SiO_2)_{60}$ was prepared in the same manner as in Example 13 except that 627 grams of barium nitrate $[Ba(NO_3)_2]$ was used instead of 97 grams of cupric nitrate.

Example 21

A catalyst having the empirical formula:

$Zn_3 Mo_{0.25} Te_1 Fe_{10} Sb_{25} O_{71} \cdot (SiO_2)_{60}$ was prepared in the same manner as in Example 13 except that 714 grams of zinc nitrate $[Zn(NO_3)_2 \cdot 6H_2O]$ was used instead of 97 grams of cupric nitrate.

Example 22

A catalyst having the empirical formula:

$Cd_3 Mo_{0.25} Te_1 Fe_{10} Sb_{25} O_{71} \cdot (SiO_2)_{60}$ was prepared in the same manner as in Example 13 except that 740 grams of cadmium nitrate $[Cd(NO_3)_2 \cdot 4H_2O]$ was used instead of 97 grams of cupric nitrate.

Comparative Example 1

A catalyst having the empirical formula:

$V_{0.1} Te_2 Fe_{10} Sb_{50} O_{119} \cdot (SiO_2)_{60}$ was prepared in the same manner as in Example 1 except that magnesium nitrate was not added.

Comparative Example 2

A catalyst having the empirical formula:

$W_{0.5} Te_1 Fe_{10} Sb_{25} O_{69} \cdot (SiO_2)_{30}$ was prepared in the same manner as in Example 7 except that lanthanum nitrate was not added.

Comparative Example 3

A catalyst having the empirical formula:

$Mo_{0.25} Te_1 Fe_{10} Sb_{25} O_{68} \cdot (SiO_2)_{60}$ was prepared in the same manner as in Example 13 except that cupric nitrate was not added.

EVALUATION TEST OF CATALYST AND RESULTS THEREOF

The evaluation test results (the judgement of "Sticks" formation degree) of the catalysts produced by the foregoing examples and the forgoing comparative examples are shown in Tables 1–3.

1. Optical Microscopic Observation

The simplest way of judging "Sticks" formation degree directly and sensuously is to observe a test catalyst directly under an optical microscope. All of the test catalysts were observed under an optical microscope by reflection method and some of them were photographed (about 100 magnifications).

Figure 2:
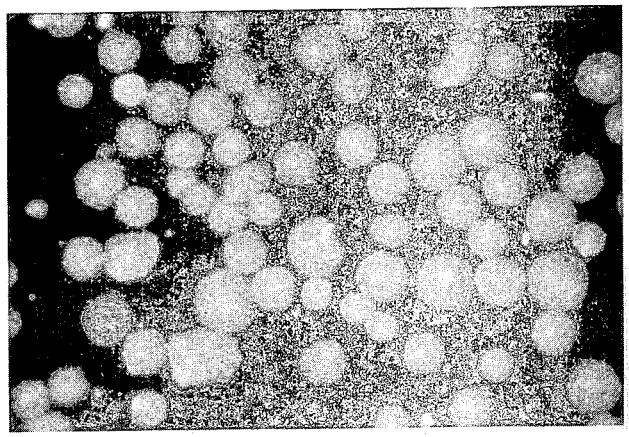
Figure 3:
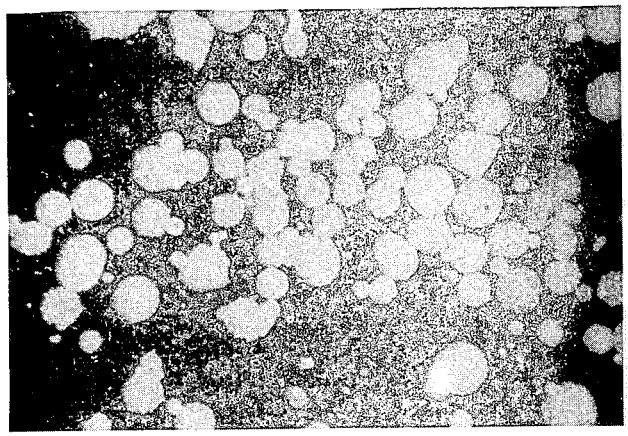

FIGS. 1 and 2 of the attached drawings show optical microscopic photographs of catalysts of examples 12–c and 6 respectively, and FIG. 3 shows an optical microscopic photograph of the catalyst of comparative example 2.

A, B and C described in Tables 1–3 mean the following facts respectively:

A. "Sticks" formation is substantially not or very little observed (a state which is the same as or similar to that of FIG. 1)

B. "Sticks" formation is a little observed, but the amount thereof is so little that practically any hindrance is scarcely experienced (a state which is the same as or similar to that of FIG. 2)

C. "Sticks" formation is remarkably observed, and the amount thereof is so much that practically considerable hindrance is experienced (a state which is same as or similar to that of FIG. 3)

D. A state which is more miserable than C, and is of little value as commodity.

2. Intensity Ratio of X-ray Diffraction for Antimony Tetroxide ($Sb_2O_4$)

It is found that "Sticks" are antimony oxides which comprise mainly antimony tetroxide, and that there are clear correspondence relations between the amount of "Sticks" formed (observed by an optical microscope) and the amount of antimony tetroxide in the catalyst (calculated by X-ray diffraction).

Numerical values in the column "$Sb_2O_4$ Intensity Ratio of X-ray Diffraction" of Tables 1–3, are those obtained as follows: Each of the test catalysts was crushed to finely ground powder form, and the resulting powder was subjected conventionally to X-ray diffraction analysis to obtain diffraction intensity of antimony tetroxide in each catalyst. The values thus obtained are expressed in relative values compared with the diffraction intensity of catalyst of comparative example 2 (said diffraction intensity is defined as 10).

The less the amount of antimony tetroxide in a catalyst, i.e., the smaller the diffraction intensity of antimony tetroxide in a catalyst, the less the amount of "Sticks" formed.

Compared with the fact that the judgement of "Sticks" formation by means of an optical microscopic observation is sensuous and qualitative, the judgement of "Sticks" formation by means of the "intensity ratio of X-ray diffraction for antimony tetroxide" can be said to be relatively quantitative.

3. Deviation of Antimony Content

A test catalyst (catalyst particles for fluidized-bed) was subjected to attrition test for a given time under a definite violent fluidized state, and antimony content of the catalyst before the test (L % by weight) and antimony content of fine powdered attrition-loss catalyst which was lost by attrition and scattered out of the system during the test period (M % by weight) were measured. From the values, deviation of antimony content $N$ [$N=(M-L)/L \times 100 \%$] was calculated. The value $N$ shows a degree of "Sticks" formation considerably quantitatively. This will be easily understood from the fact that "Sticks" are of antimony oxide which comprise mainly antimony tetroxide and that "Sticks" tend to peel off easily from the catalyst surface to be scattered (i.e., that peeling-off of "Sticks" is done much easier than attrition loss of the catalyst per se). It is of course that the lower $N$ value of the catalyst, the less the amount of "Sticks" formed.

"Deviation of antimony content" in Tables 1–3 shows N (%) value thus measured.

The fluidization condition employed in this test is based upon the condition described in "Test Method for Synthetic Cracking Catalyst" 6/31 – 4m – 1/57 published by American Cyanamide Co., said Test Method being known as a test method of strength of "fluidized cracking catalyst" (what is called "FCC catalyst").

The tests were carried out with catalyst particles having a particle size range of 44–88 microns, and the test time is 15 hours per one sample. Analysis of antimony content in catalyst was carried out by means of luminescent X-ray method.

ACTIVITY TEST OF CATALYST

In order to show the fact that "anti-sticks" component (Qe) contained in the catalyst composition of the present invention does not affect adversely on the activity of base multiple promoted catalyst ($Fe_a Sb_b Me_c Te_d O_f$), the following activity tests were carried out.

a. Test using a fluidized bed reactor

Into a reactor having 2 inches of inside diameter and equipped inside thereof with baffle plates which serves to increase the contact efficiency, there was charged 1,600 gr. of a catalyst having a mean weight particle size of 50–70 microns. Gaseous starting materials, in case of the acrylonitrile production, for example, such as propylene, ammonia and air, were introduced thereinto at a rate of 13 cm/sec. Gaseous products were gas-chromatographed for quantitative analysis.

On each catalyst to be tested there was detected the optimum reaction temperature at which the maximum conversion of starting hydrocarbon to the object compound was obtained and the conversion at the temperature was shown in Table 4.

b. Test using a micro reactor

Into a U-shaped reactor having 6 m/m of inside diameter there was charged 0.8 gr. of a catalyst having a means weight particle size of 50–70 microns, and gaseous starting materials were fed thereinto, gaseous product being gas-chromatographed for quantitative analysis.

On each catalyst to be tested there was detected the optimum reaction temperature at which the maximum conversion of starting hydrocarbon to the object compound was obtained and the conversion at the temperature was shown in Table 4.

The term "conversion" in Table 4 means conversion of olefin (starting hydrocarbon) to the object product, and the definition thereof is as follows:

conversion (%)

$$= \frac{\text{carbon weight of the object compound formed}}{\text{carbon weight of olefin fed}} \times 100\ (\%)$$

TABLE 1 EVALUATION TEST OF CATALYSTS (1)

[Catalyst Composition : $Fe_{10} Sb_{50} V_{0.1} Te_2 Q_e O_f \cdot (SiO_2)_{60}$]

| Test Catalyst | $Q_e$ | Microscopic Observation | $Sb_2O_4$ Intensity Ratio of X-ray Diffraction | Deviation of Sb Content (%) |
|---|---|---|---|---|
| example 1 | $Mg_5$ | A | 4 | 4.2 |
| 2 | $Cu_{12}$ | A | 2 | 1.1 |
| 3 | $Ag_{0.7}$ | B – C | 11 | 18.5 |
| 4 | $Zn_3$ | B | 8 | 7.8 |
| 5 | $Ce_2$ | B | 8 | 5.0 |
| 6 | $Al_3$ | B | 8 | 4.1 |
| Comparative Example 1 | None | D | 17 | 45.0 |

TABLE 2 EVALUATION TEST OF CATALYST (2)

[CATALYST COMPOSITION : $Fe_{10} Sb_{25} W_{0.5} Te_1 Q_e O_f \cdot (SiO_2)_{30}$]

| Test Catalyst | $Q_e$ | Microscopic Observation | $Sb_2O_4$ Intensity Ratio of X-ray Diffraction | Deviation of Sb Content (%) |
|---|---|---|---|---|
| example 7 | $La_2$ | A | 3 | 4.6 |
| 8 | $Ce_2$ | A | 3 | 3.8 |
| 9 | $Mg_6$ | A | 0 | 1.5 |
| 10 | $Cd_3$ | A | 2 | 2.3 |
| 11 | $Al_3$ | A | 1 | 1.2 |
| 12-a | $Cu_{0.5}$ | B | 4 | 6.5 |
| 12-b | $Cu_3$ | A | 0 | 1.1 |
| 12-c | $Cu_9$ | A | 0 | –0.7 |
| Comparative Example 2 | None | C | 10 | 25.2 |

TABLE 3 EVALUATION TEST OF CATALYST (3)

[CATALYST COMPOSITION : $Fe_{10} Sb_{25} Mo_{0.25} Te_1 Q_e O_f \cdot (SiO_2)_{60}$]

| Test Catalyst | $Q_e$ | Microscopic Observation | $Sb_2O_4$ Intensity Ratio of X-ray Diffraction | Deviation of Sb Content (%) |
|---|---|---|---|---|
| example 13 | $Cu_{0.5}$ | B | 3 | 3.9 |
| 14 | $La_2$ | A | 1 | 2.1 |
| 15 | $Al_3$ | A | 1 | 1.4 |
| 16 | $Be_3$ | A | 0 | 2.0 |
| 17 | $Mg_5$ | A | 0 | 1.7 |
| 18 | $Ca_5$ | A | 0 | –0.9 |
| 19 | $Sr_3$ | A | 0 | 1.3 |
| 20 | $Ba_3$ | A | 1 | 1.5 |
| 21 | $Zn_3$ | A | 0 | 0.8 |
| 22 | $Cd_3$ | A | 1 | 1.2 |
| Comparative Example 3 | None | C | 8 | 20.9 |

TABLE 4.—ACTIVITY TEST RESULTS

| Test catalyst | Starting hydrocarbon | Reactant gas composition (molar ratio) | | | | Reaction temperature (°C.) | Contact time (sec.) | Object product | Conversion, percent | Reactor used |
| | | Hydrocarbon | $NH_3$ | Air | $H_2O$ | | | | | |
|---|---|---|---|---|---|---|---|---|---|---|
| Example: | | | | | | | | | | |
| 1 | Propylene | 1 | 1.2 | 11 | | 460 | 6 | Acrylonitrile | 75 | a |
| 4 | Iso-butylene | 1 | 1.5 | 13 | 3 | 440 | 6 | Methacrylonitrile | 65 | b |
| 5 | Propylene | 1 | | 9 | 3 | 450 | 5 | Acrolein | 67 | b |
| 6 | do | 1 | 1.2 | 11 | | 460 | 6 | Acrylonitrile | 74 | a |
| Comparative Example 1 | Propylene | 1 | 1.2 | 11 | | 460 | 6 | Acrylonitrile | 76 | a |
| | Iso-butylene | 1 | 1.5 | 13 | 3 | 440 | 6 | Methacrylonitrile | 62 | b |
| | Propylene | 1 | | 9 | 3 | 460 | 5 | Acrolein | 68 | b |
| Example: | | | | | | | | | | |
| 7 | Butene-1 | 1 | | 11 | 1.5 | 400 | 7 | Butadiene | 78 | b |
| 10 | Propylene | 1 | | 9 | 3 | 450 | 5 | Acrolein | 68 | b |
| 12-b | do | 1 | 1.2 | 11 | | 460 | 6 | Acrylonitrile | 77 | b |
| Comparative Example 2 | Propylene | 1 | 1.2 | 11 | | 460 | 6 | Acrylonitrile | 75 | b |
| | Butene-1 | 1 | | 11 | 1.5 | 400 | 7 | Butadiene | 78 | b |
| Example: | | | | | | | | | | |
| 13 | Propylene | 1 | 1.2 | 11 | | 460 | 6 | Acrylonitrile | 77 | a |
| 16 | Iso-butylene | 1 | 1.5 | 13 | 3 | 440 | 6 | Methacrylonitrile | 65 | b |
| 18 | do | 1 | | 12 | 5 | 410 | 5 | Methacrolein | 62 | b |
| 22 | Butene-1 | 1 | | 11 | 1.5 | 400 | 7 | Butadiene | 79 | b |
| Comparative Example 3 | Propylene | 1 | 1.2 | 11 | | 460 | 6 | Acrylonitrile | 76 | a |
| | Iso-butylene | 1 | | 12 | 5 | 410 | 5 | Methacrolein | 63 | b |
| | Butene-1 | 1 | | 11 | 1.5 | 400 | 7 | Butadiene | 78 | b |

What we claim is:

1. A catalyst composition for an oxidation reaction selected from the group consisting of ammoxidation of olefins to the corresponding unsaturated nitriles; oxidation of olefins to the corresponding unsaturated aldehydes, and oxidative dehydrogenation of olefins having four to eight carbon atoms to the corresponding diolefins, said catalyst composition having the empirical formula:

$Fe_a Sb_b Me_c Te_d Q_e O_f$ wherein Me represents an element selected from the group consisting of V, Mo and W ; Q represents an element selected from the group consisting of Cu, Ag, Be, Mg, Ca, Sr, Ba, Zn, Cd, La, Ce and Al ; and $a, b, c, d$, and $f$ represent atomic ratios and $a = 10$
$b = 20 - 60$
$c = 0.01 - 1$
$d = 0.05 - 5$
$e = 0.1 - 20$
$f = $ the number of oxygen atoms in the oxide produced by combining the above-mentioned components which corresponds to $40 - 177$.

2. The catalyst composition according to claim 1 wherein said catalyst composition is supported by a silica carrier, and the carrier is present in 10 to 90 percent by weight of the entire catalyst consisting of the catalyst composition and the carrier.

3. The catalyst composition according to claim 1, activated by heating at a temperature in the range of from 700° to 1,100°C.

4. The catalyst composition according to claim 1, subjected to heat treatment at a temperature in the range of from 200° to 600°C. for 2 to 24 hours followed by calcination at a temperature in the range of from 700° to 1,100°C. for 1–48 hours.

* * * * *